United States Patent
Yang et al.

(10) Patent No.: US 8,064,942 B2
(45) Date of Patent: Nov. 22, 2011

(54) METHOD AND APPARATUS FOR TRANSMITTING AND RECEIVING RESOURCE SCHEDULING INFORMATION AND SCHEDULING RESOURCES

(75) Inventors: Guang Yang, Beijing (CN); Xiaoqi Wang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 736 days.

(21) Appl. No.: 12/166,808

(22) Filed: Jul. 2, 2008

(65) Prior Publication Data

US 2009/0011698 A1  Jan. 8, 2009

(30) Foreign Application Priority Data

Jul. 5, 2007 (CN) .......................... 2007 1 0118424

(51) Int. Cl.
*H04B 7/00* (2006.01)
*H04M 3/42* (2006.01)
*H04H 60/61* (2008.01)

(52) U.S. Cl. ....... 455/518; 455/519; 455/3.01; 455/517; 455/416

(58) Field of Classification Search .................. 455/517, 455/518, 519, 521, 416
See application file for complete search history.

(56) References Cited

U.S. PATENT DOCUMENTS

| | | | | |
|---|---|---|---|---|
| 7,924,760 | B2 * | 4/2011 | Ding et al. | 370/312 |
| 2006/0030342 | A1 * | 2/2006 | Hwang et al. | 455/466 |
| 2008/0049682 | A1 * | 2/2008 | Ding et al. | 370/335 |
| 2008/0101268 | A1 * | 5/2008 | Sammour et al. | 370/311 |
| 2008/0287127 | A1 * | 11/2008 | Wu et al. | 455/434 |

\* cited by examiner

*Primary Examiner* — Tilahun B Gesesse
(74) *Attorney, Agent, or Firm* — Workman Nydegger

(57) ABSTRACT

An MBMS service-based method for transmitting resource scheduling information is provided. The method includes: before transmitting MBMS information, determining information on a repetition period with which a local cell transmits the MBMS information; and determining repetition periods with which respective neighboring cells that carrying the MBMS information transmit the MBMS information; transmitting an identifier of the local cell and an identifier of the neighboring cell, as well as the determined on the repetition periods, to a terminal of the local cell. Thus the terminal can perform chip combining in divided time periods on the MBMS information of corresponding neighboring cells.

12 Claims, 4 Drawing Sheets

METHOD AND APPARATUS FOR TRANSMITTING AND RECEIVING RESOURCE SCHEDULING INFORMATION AND SCHEDULING RESOURCES

CROSS-REFERENCE TO RELATED APPLICATION

This application claims priority to and benefit of Chinese Application Serial No. 200710118424.8, filed on Jul. 5, 2007.

FIELD OF THE INVENTION

The present invention relates to a method and system for resource scheduling, in particular relates to a method and system for resource scheduling based on MBMS services; the present invention also relates to methods for transmitting and receiving resource scheduling information based on MBMS services, and relates to a base station controller and a terminal based on resource scheduling of MBMS services.

BACKGROUND OF THE INVENTION

The Multimedia Broadcast/Multicast Service Single Frequency Network (MBSFN) technology is an enhanced version of the Multimedia Broadcast/Multicast Service (MBMS) technology. Under the MBSFN mode, all of the neighboring base stations synchronously transmit identical radio signals. A terminal can treat signals that came from different base stations as multi-path signals, and performs over-the-air signal combining on these multi-path signals in order to increase receive gain of signals, thus improving the receiving effect of signals.

However, when a universal terrestrial radio access network (UTRAN) transmits signals for some MBMS service, e.g. a television channel, using the MBSFN mode, it is necessary to configure a special scrambling code for said service. The scrambling code is related to the service, i.e. different cells need to use the same scrambling code when transmitting identical television channel signals, so as to ensure that the terminal can perform combining on these signals. Hence, the UTRAN needs to plan for service-related scrambling codes, and ensures that these service-related scrambling codes are different from cell scrambling codes, thus bringing forward new requirements of network planning/optimization to the service provider, increasing design difficulty and cost requirement.

In the conventional technology, chip combining is often utilized for MBMS service. Specifically, when different cells are transmitting identical television channel signals, these cells still use their respective scrambling code to scramble the television channel signals. When a terminal is receiving television channel signals from different cells, though the scrambled television channel signals have different radio signals, the user equipment (UE) uses the chip combining mode, i.e. the multi-cell joint detection method, to perform chip-level combining on the received television channels of different cells so as to increase the receive gain of the signals, thus improving the signal receiving effect. Each neighboring cell has a unique neighboring cell identifier, and contains multiple S-CCPCH channels. When an MBMS service needs to perform chip combining, it designates the chip combining mode to the multiple S-CCPCH channels that are carrying this MBMS service; a terminal receives this message, then for each MBMS service of its interest, the terminal receives the configuration information of the S-CCPCHs that are carrying this MBMS service in the local cell as well as in neighboring cells that support said MBMS service, and performs continuous chip combining.

When using this technology for the scheduling of the S-CCPCHs that carry the same MBMS service, once the multiple cells that carry said service are determined, the carrying method is indicated in the message described above, and until said message is transmitted again, the carrying method for said service is required to remain unchanged for the cells that carry said service. In other words, the terminal continuously performs chip combining with neighboring cells in this period of time, based on the scheduling information of the S-CCPCHs that carry the MBMS service in the local cell and the neighboring cells. However, in practice, because the demand of resource scheduling is different for different neighboring cells, for the same MBMS service the service carrying status may have changed before the above described message is transmitted again. For example, the shopping information service of a shopping mall, the scheduling cycle of this MBMS service can be very short in the shopping mall (i.e. the local cell), since the mobile users in the shopping mall will not be put off by the frequent receiving of the shopping information; however, in the cells close to the shopping mall (i.e. the neighboring cells) the scheduling cycle of the MBMS service should be relatively long, otherwise the frequent receiving of advertisement-based shopping information may cause offence to the mobile users in these cells.

The conventional system and method has the following disadvantages: The chip combining technology requires that, for the same MBMS service, different cells must have consistent service carrying status during the time period from the end of the last transmission of the control information to the beginning of the next transmission of the control information, while the terminal continuously performs chip combining on these different cells. The technology lacks the mechanism for discontinuously scheduling the S-CCPCHs (which is used for chip combining) of neighboring cells, thus can not adapt to the situation where the same MBMS service is discontinuously scheduled in different cells. Therefore, there is a need for a method and system to overcome these disadvantages.

BRIEF SUMMARY OF THE INVENTION

One aspect of the present invention is to provide a resource scheduling information transmission method based on MBMS services, in order to enable a terminal to accurately and promptly perform chip combining every time MBMS information is received. The method comprising the steps of: before transmitting MBMS information, determining the repetition period information of the local cell transmitting the MBMS information; and determining the repetition period information of the neighboring cells that carry the MBMS information transmitting said MBMS information; transmitting the identifiers of the local cell and neighboring cells, as well as the determined repetition period information of each cell transmitting the MBMS information, to a terminal of the local cell.

Another aspect of the present invention is to provide a base station controller, which is used to determine and transmit to a terminal of the local cell the identifiers of the local cell and neighboring cells, as well as the resource scheduling information of the repetition period information corresponding to each cell. The base station controller comprising: a determining module, which is used, before transmitting MBMS information, to determine the repetition period information of the local cell transmitting the MBMS information, and to determine the repetition period information of the neighboring cells that carry the MBMS information transmitting said MBMS information; a downlink transmission module, which is connected to the determining module, and is used to transmit to a terminal of the local cell the identifiers of the local cell and neighboring cells, as well as the repetition period information of each cell transmitting the MBMS information, whereas the repetition period information is determined by the determining module.

In the above embodiments of the MBMS service-based resource scheduling information transmission method and the base station controller, the terminal is enabled to preliminarily analyze the status of MBMS information transmission of the local cell and neighboring cells before receiving MBMS information; the terminal is also enabled to easily and swiftly perform chip combining while receiving MBMS information. The above effects are achieved by determining and transmitting the identifiers of the local cell and neighboring cells, as well as the repetition period information corresponding to each cell, to the terminal of the local cell, before transmitting the MBMS information to the terminal of the local cell.

Another aspect of the present invention is to provide a resource scheduling information receiving method based on MBMS services, in order to enable the terminal to perform chip combining with the MBMS information of the corresponding neighboring cells during the corresponding time periods, while based on the received resource scheduling information. The method comprising the steps of: before receiving MBMS information, based on the received repetition period information of the local cell transmitting the MBMS information, determining the time periods for performing chip combining with the MBMS information transmitted by the local cell; based on the received identifiers of neighboring cells and the repetition period information of said neighboring cells transmitting the MBMS information, obtaining the identifiers of neighboring cells that will perform chip combining with the local-cell-transmitted MBMS information during the determined time periods; during the determined time periods, performing chip combining between the MBMS information transmitted by the local cell and the MBMS information transmitted by the neighboring cells that correspond to the obtained neighboring cell identifiers.

Still another aspect of the present invention provides a terminal, which is used to perform chip combining on the MBMS information of the corresponding neighboring cells during the corresponding time periods, based on the received resource scheduling information. The terminal comprising: a receiving module, which is used to receive the repetition period information of the local cell transmitting the MBMS information, the identifiers of neighboring cells, and the repetition period information of said neighboring cells transmitting the MBMS information, before receiving the MBMS information; a determining module, which is used to determine the time periods for performing chip combining with the MBMS transmitted by the local cell, based on the receiving-module-received repetition period information of the local cell transmitting the MBMS information; a cell identifier obtaining module, which is used for obtaining the identifiers of neighboring cells that can run chip combining with the local-cell-transmitted MBMS information during the time periods determined by the determining module, based on the neighboring cell identifiers and the repetition period information of said neighboring cells transmitting the MBMS information, whereas said neighboring cell identifiers and said repetition period information are received by the receiving module; a chip combining module, which is used for: during the time periods determined by the determining module, performing chip combining between the MBMS information transmitted by the local cell and the MBMS information transmitted by the neighboring cells that correspond to the neighboring cell identifiers obtained by the cell identifier obtaining module.

In the above embodiments of the MBMS service-based resource scheduling information receiving method and the terminal, through the analysis of the received resource scheduling information, the terminal is able to preliminarily analyze the status of MBMS information scheduling in the local cell and neighboring cells, so as to decide whether to use continuous combining (when the MBMS information repetition periods of all of the cells have the same length of 1) or divided-time period combining (when the MBMS information repetition periods of some of the cells have lengths that are greater than 1). Thus chip combining can be performed easily and swiftly while receiving MBMS information.

Another aspect of the present invention provides a resource scheduling method based on MBMS services, in order to adapt to the chip combining where a same MBMS service is discontinuously scheduled in different cells. The method comprising the steps of: before transmitting MBMS information, determining the repetition period information of the local cell transmitting the MBMS information; and determining the repetition period information of the neighboring cells that carry the MBMS information transmitting said MBMS information; transmitting the identifiers of the local cell and neighboring cells, as well as the determined repetition period information of each cell transmitting the MBMS information, to a terminal of the local cell; before receiving the MBMS information, based on the received repetition period information of the local cell transmitting the MBMS information, said terminal determining the time periods for performing chip combining with the MBMS information transmitted by the local cell; based on the received identifiers of the neighboring cells and the repetition period information of said neighboring cells transmitting the MBMS information, obtaining the identifiers of neighboring cells that will perform chip combining with the local-cell-transmitted MBMS information during the determined time periods; and during the determined time periods, performing chip combining between the MBMS information transmitted by the local cell and the MBMS information transmitted by the neighboring cells that correspond to the obtained neighboring cell identifiers.

Yet another aspect of the present invention provides a resource scheduling system based on MBMS services, in order to adapt to the chip combining where a same MBMS service is discontinuously scheduled in different cells. The resource scheduling system comprising a base station controller and a terminal, where the base station controller comprising: a determining module, which is used, before transmitting the MBMS information, to determine the repetition period information of the local cell transmitting the MBMS information, and determine the repetition period information of the neighboring cells that carry the MBMS information transmitting said MBMS information; a downlink transmission module, which is connected to the determining module, and is used to transmit to a terminal of the local cell the identifiers of the local cell and neighboring cells, as well as the repetition period information of each cell transmitting the MBMS information, whereas the repetition period information is determined by the determining module. The terminal comprising: a receiving module, which is used to receive the repetition period information of the local cell transmitting the MBMS information, the identifiers of neighboring cells, and the repetition period information of said neighboring cells transmitting the MBMS information, before receiving the MBMS information; a determining module, which is used to determine the time periods for performing chip combining with the MBMS transmitted by the local cell, based on the receiving-module-received repetition period information of the local cell transmitting the MBMS information; a cell identifier obtaining module, which is used for obtaining the identifiers of neighboring cells that can run chip combining with the local-cell-transmitted MBMS information during the time periods determined by the determining module, based on the neighboring cell identifiers and the repetition period information of said neighboring cells transmitting the MBMS information, whereas said neighboring cell identifiers and said repetition period information are received by the receiving module; a chip combining module, which is used for: during the time periods determined by the determining module, performing chip combining between the MBMS information transmitted by the local cell and the MBMS information transmitted by the neighboring cells that correspond to the neighboring cell identifiers obtained by the cell identifier obtaining module.

In the above embodiments of resource scheduling method and system based on MBMS services, by introducing the repetition period information of the local cell and neighboring cells transmitting the same MBMS information, the base station controller determines and transmits the identifiers of the local and neighboring cells as well as the repetition period information corresponding to each cell to a terminal of local cell, before transmitting MBMS information to the terminal of the local cell. Thus enables the terminal to perform preliminary analysis on MBMS information transmission status of the local cell and neighboring cells before receiving the MBMS information, so as to decide whether to use continuous combining (when the MBMS information repetition periods of all of the cells have the same length of 1) or divided-time period combining (when the MBMS information repetition periods of some of the cells have lengths that are greater than 1). Hence MBMS information chip combining can be performed accurately, easily and swiftly while receiving the MBMS information.

BRIEF DESCRIPTION OF THE DRAWINGS

FIG. 3 is a schematic diagram of a resource scheduling list according to the present invention;

FIG. 4 is a schematic diagram of a resource scheduling list; and

DETAILED DESCRIPTION OF THE INVENTION

The technical scheme of the present invention is described below in further detail through figures and embodiments. The following embodiments of the present invention use the example of adding the resource scheduling information, which include the local and neighboring cell identifiers and the repetition period information of each cell transmitting MBMS information, into a resource scheduling list for transmission. While the following embodiments all use the above example for their description, the technical scheme of the present invention certainly can use other methods beside the resource scheduling list to downlink transmit cell identifiers and repetition period information. The other methods include, for example, encapsulating the local and neighboring cell identifiers and the repetition period information of each cell transmitting MBMS information directly into either standard protocol messages or proprietary protocol messages for downlink transmission, i.e. the technical scheme of the present invention has multiple methods for downlink transmitting information.

Figure 1:
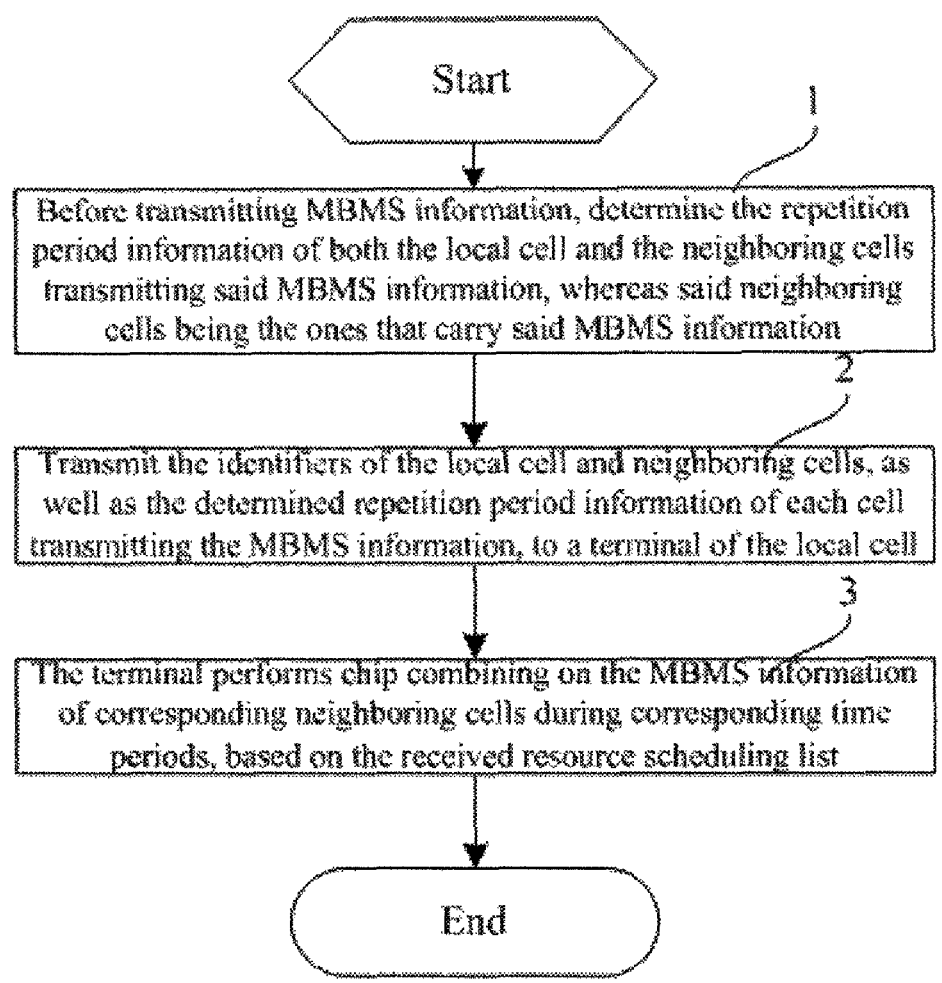
FIG. 1 is a flowchart of the MBMS service-based resource scheduling method according to the present invention.

An embodiment of the present invention provides a resource scheduling method based on MBMS services, as shown in FIG. 1, the method comprising the steps of:

Step 1, before transmitting MBMS information, determine the repetition period information of both the local cell and the neighboring cells transmitting said MBMS information, whereas said neighboring cells being the ones that carry said MBMS information;

Step 2, transmit the local and neighboring cell identifiers, as well as the determined repetition period information of each cell transmitting the MBMS information, to a terminal of said local cell (here for description we use the example of adding the local and neighboring cell identifiers, as well as the repetition period information of each cell transmitting MBMS information, into a resource scheduling list for transmission);

Step 3, before the terminal receiving the MBMS information, according to the received resource scheduling list, perform chip combining on the MBMS information of the corresponding neighboring cells during the corresponding time periods.

This embodiment, by introducing the repetition period information of the local cell and neighboring cells transmitting the same MBMS information, transmits the resource scheduling list that carries the identifiers of the local and neighboring cells, as well as the repetition period information corresponding to each cell, to a terminal of the local cell; then the terminal performs chip combining on the MBMS information of the corresponding neighboring cells during the corresponding time periods, based on the resource scheduling list. Thus this embodiment extended the situation in the prior art that only continuous chip combining is supported, hence adapted to the chip combining operation when the same MBMS service is scheduled either continuously (when the MBMS information repetition periods of all of the cells have the same length of 1) or discontinuously (when the MBMS information repetition periods of some of the cells have lengths that are greater than 1) in different cells.

Figure 2:
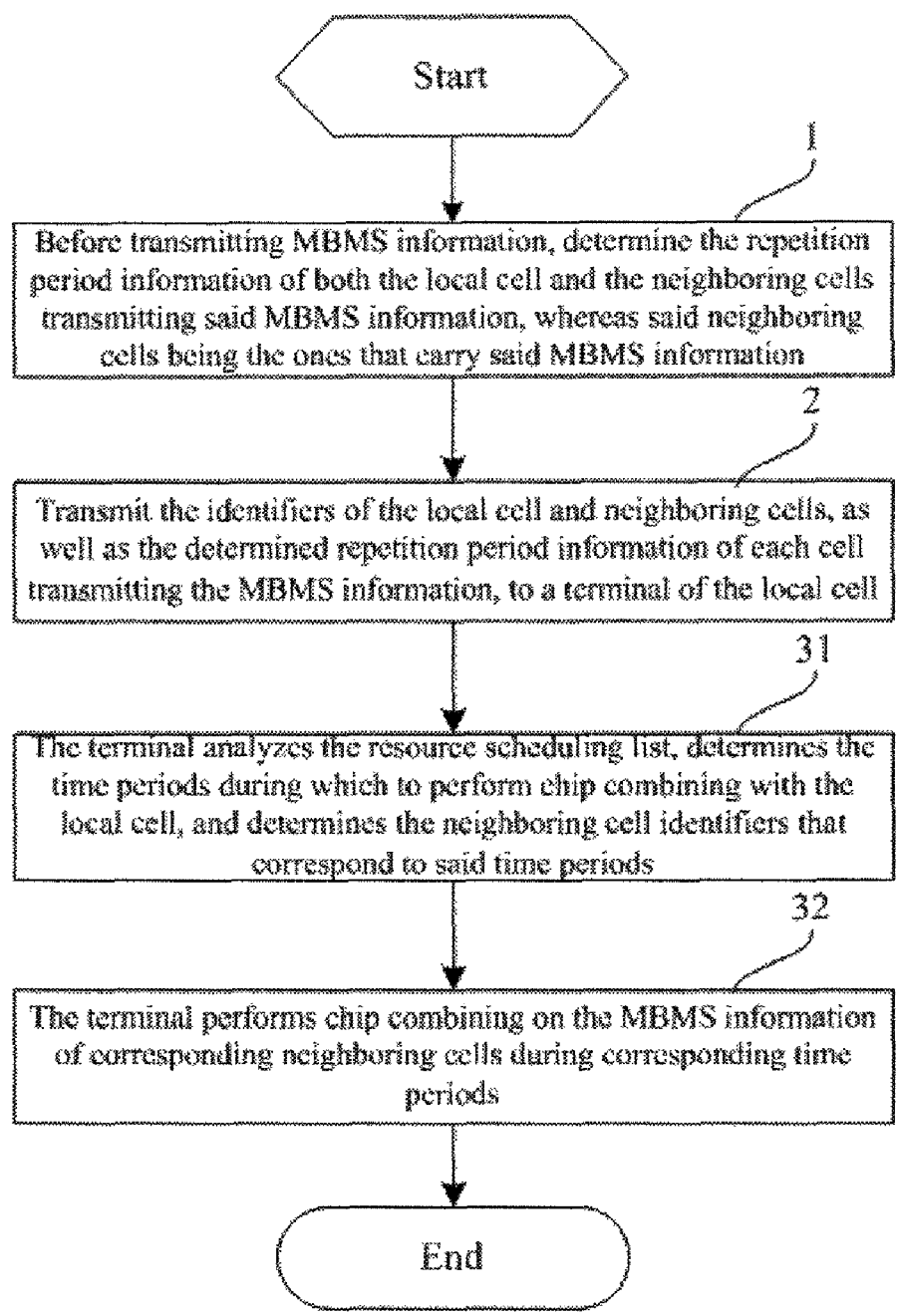
FIG. 2 is a flowchart of an alternative embodiment of the MBMS service-based resource scheduling method according to the present invention.

As shown in FIG. 2, an alternative embodiment of the resource scheduling method based on MBMS services as shown in FIG. 1 comprises the steps of: Step 1, before transmitting MBMS information, determine the repetition period information of both the local cell and the neighboring cells transmitting said MBMS information, whereas said neighboring cells being the ones that carry said MBMS information; and Step 2, transmit the local and neighboring cell identifiers, as well as the determined repetition period information of each cell transmitting the MBMS information, to a terminal of said local cell (here for description we use the example of adding the local and neighboring cell identifiers, as well as the repetition period information of each cell transmitting MBMS information, into a resource scheduling list for transmission).

Step 31, the terminal analyzes the resource scheduling list, determines the time periods during which to perform chip combining on the MBMS information with the local cell, and determines the identifiers of neighboring cells that correspond to said time periods; and Step 32, the terminal performs chip combining on the MBMS information of the corresponding neighboring cells during the corresponding time periods.

For a same MBMS service, because of various resource scheduling demands, different neighboring cells may have different carrying status for MBMS information. Assume that the MBMS information is the shopping information of a shopping mall; Cell 1 represents the local cell, in which the shopping mall is located; Cell 2 represents a neighboring cell near the shopping mall; Cell 3 represents another neighboring cell near the shopping mall; Cell 4 represents a cell located far away from the shopping mall. For the same MBMS service, because of various resource scheduling demands, the carrying status may have changed for different neighboring cells before the message is transmitted again. In practice, for the MBMS information of the shopping information of a shopping mall, in Cell 1 where the shopping mall is located, the repetition period length (i.e. scheduling cycle) of said MBMS information can be very short, since mobile users in the shopping mall will not be put off by frequently receiving the shopping information; However in the cells close to the shopping mall and cells that are far away, the repetition period length (i.e. scheduling cycle) of said MBMS information should be set longer, otherwise mobile users in these cells will be irritated by the frequent receiving of such advertisement-based shopping information.

Figures 3, 4:
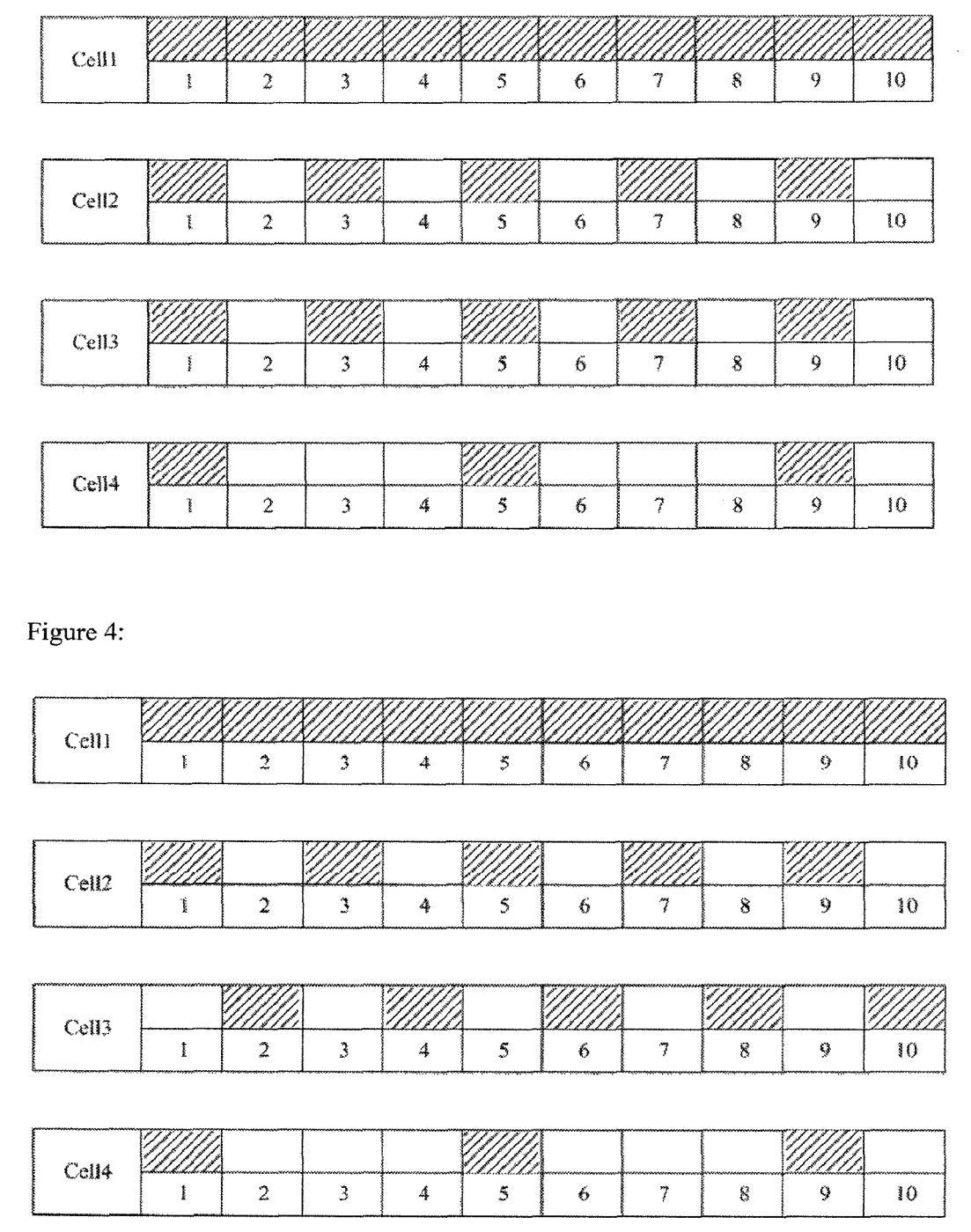

Repetition period information includes repetition period length. Below, Cells 1 to 4 are used as examples to describe the process of performing chip combining in divided time periods when the cycle lengths are different. As shown in FIG. 3, the resource scheduling list in this figure contains cell identifiers and the repetition period length corresponds to each cell, where the shaded parts represents the time periods of MBMS information transmission:

Cell 1 has a repetition period length of 1;
Cell 2 has a repetition period length of 2;
Cell 3 has a repetition period length of 2;
Cell 4 has a repetition period length of 4;

The repetition period length reflects the frequency of MBMS information being scheduled, where Cell 1 has the highest scheduling frequency, Cell 2 and Cell 3 have lower scheduling frequencies, and Cell 4 has the lowest scheduling frequency.

It can be seen in FIG. 3 that among Cells 1 to 4 there are cells whose repetition period lengths of MBMS information are greater than 1. In such a case, the terminal in Cell 1 analyzes the resource scheduling list shown in FIG. 3, then determines the time periods during which to perform chip combining on the MBMS information with Cell 1, and also determines the neighboring cell identifiers corresponding to said time periods. The detailed process of the terminal analyzing the resource scheduling list is as follows:

1). Determine that the time periods during which to perform chip combining with Cell 1 are the time periods 1, 5, and 9 of the radio frame, and the neighboring cells that correspond to these time periods are Cells 2, 3, and 4; The terminal detects the Cells 2, 3, and 4 during the time periods 1, 5, and 9 of the radio frame, and performs the chip combining among 4 cells with the Cells 2, 3, and 4, i.e. the terminal is able to receive the MBMS information in the S-CCPCHs that are carrying this MBMS service on the local cell and Cells 2, 3, and 4;

2). Determine that the time periods during which to perform chip combining with Cell 1 are the time periods 3 and 7 of the radio frame, and the neighboring cells that correspond to these time periods are Cells 2 and 3; The terminal detects the Cells 2 and 3 during the time periods 3 and 7 of the radio frame, and performs the chip combining among 3 cells with the Cells 2 and 3, i.e. the terminal is able to receive the MBMS information in the S-CCPCHs that are carrying this MBMS service on the local cell and Cells 2 and 3.

During the practical transmission of MBMS information, sometimes a certain amount of offset may occur inside individual cycles. The offset of individual cycles reflects the position of MBMS services in a repetition period length (i.e. scheduling cycle). The individual cycle offset will affect the result of chip combining, with the value range of [0, (repetition period length−1)]. The repetition period lengths of the Cells 2 and 3 are the same (both equal to 2), but the MBMS service is placed at different positions in these repetition period lengths. Take the individual cycle offset being 1 in Cell 3 as the example, as shown in FIG. 4, the resource scheduling list reflected in this figure includes cell identifiers, repetition period lengths corresponding to each cell, and offset of individual cycles.

Cell 1 has a repetition period length of 1, with individual cycle offset being 0;
Cell 2 has a repetition period length of 2, with individual cycle offset being 0;
Cell 3 has a repetition period length of 2, with individual cycle offset being 1;
Cell 4 has a repetition period length of 4, with individual cycle offset being 0.

It can be seen in FIG. 4 that among Cells 1 to 4 there exist cells for which the MBMS information repetition period lengths are greater than 1. In such a case the terminal in Cell 1 analyzes the resource scheduling list shown in FIG. 4, then determines the time periods during which to perform chip combining on the MBMS information with Cell 1, and also determines the neighboring cell identifiers corresponding to said time periods. The detailed process of the terminal analyzing the resource scheduling list is as follows:

1). Determine that the time periods during which to perform chip combining with Cell 1 are the time periods 3 and 7 of the radio frame, and the neighboring cell that corresponds to these time periods is Cell 2; The terminal detects the Cell 2 during the time periods 3 and 7 of the radio frame, and performs the chip combining between 2 cells with the Cell 2, i.e. the terminal is able to receive the MBMS information in the S-CCPCHs that are carrying this MBMS service on the local cell and the Cell 2;

2). Determine that the time periods during which to perform chip combining with Cell 1 are the time periods 2, 4, 6, 8 and 10 of the radio frame, and the neighboring cell that corresponds to these time periods is Cell 3; The terminal detects the Cell 3 during the time periods 2, 4, 6, 8 and 10 of the radio frame, and performs the chip combining between 2 cells with the Cell 3, i.e. the terminal is able to receive the MBMS information in the S-CCPCHs that are carrying this MBMS service on the local cell and the Cell 3;

3). Determine that the time periods during which to perform chip combining with Cell 1 are the time periods 1, 5, and 9 of the radio frame, and the neighboring cells that correspond to these time periods are Cells 2 and 4; The terminal detects the Cells 2 and 4 during the time periods 1, 5, and 9 of the radio frame, and performs the chip combining among 3 cells with the Cells 2 and 4, i.e. the terminal is able to receive the MBMS information in the S-CCPCHs that are carrying this MBMS service on the local cell and Cells 2 and 4.

The above embodiments of resource scheduling method based on MBMS services, by introducing the repetition period information of the local cell and neighboring cells transmitting the same MBMS information, transmit the resource scheduling list that carries the identifiers of the local and neighboring cells, as well as the repetition period information corresponding to each cell, to a terminal of the local cell; then the terminal performs chip combining on the MBMS information of the corresponding neighboring cells during the corresponding time periods, based on the resource scheduling list. Thus this embodiment extended the situation in the prior art that only continuous chip combining is supported, hence adapted to the chip combining operation when the same MBMS service is scheduled either continuously (when the MBMS information repetition periods of all of the cells have the same length of 1) or discontinuously (when the MBMS information repetition periods of some of the cells have lengths that are greater than 1) in different cells. At the same time, since the multiple neighboring cells that carry the same MBMS service do not need to continuously transmit the MBMS service, other services can be transmitted in the transmission interval, thus increasing the utilization rate of resources.

The embodiments of the present invention provide a base station controller; said base station controller can obtain the resource scheduling information of cells that are near the base station, i.e. the neighboring cells. The base station controller comprising: A determining module, which is used, before transmitting the MBMS information, to determine the repetition period information of the local cell transmitting the MBMS information, and determine the repetition period information of the neighboring cells that carry the MBMS information transmitting said MBMS information; a downlink transmission module, which is connected to the determining module, and is used to transmit to a terminal of the local cell the identifiers of the local cell and neighboring cells, as well as the repetition period information of each cell transmitting the MBMS information, whereas said repetition period information is determined by the determining module.

The determining module specifically comprising: an adding unit, which is used to add the identifiers of the local cell and neighboring cells, as well as the repetition period information of each cell transmitting the MBMS information that determined by the determining module, into the resource scheduling list; a downlink transmitting unit, which is used to transmit said resource scheduling list to a terminal of the local cell.

The base station controller of the present invention uses a radio network controller (RNC) as an example to describe the process of a base station controller of the local cell transmitting the resource scheduling information of neighboring cells to a terminal of the local cell. The RNC adds the resource scheduling information of each neighboring cell, i.e. the repetition period information, into an "MBMS Neighbouring Cell p-t-m rb Information" message transmitted on the MCCH channel. The repetition period information contains the repetition period length of transmitting MBMS information, and can also contain offset of individual cycles. In detail, this is achieved by adding or extending fields in the TDD field of the "MBMS Neighbouring Cell p-t-m rb Information" message, with a "Repetition period" field representing the repetition period length, and an "offset" field representing the individual cycle offset. The extended fields are shown as in the following table:

| | | | |
|---|---|---|---|
| >>CHOICE mode | MP | | |
| >>>TDD | | | |
| >>>>offset | MP | Integer (0 . . . Repetition Period −1) | Indicating the starting position in an individual cycle, the default value is 0, the range of value is [0, (repetition period −1)] |
| >>>>Repetition period | MD default, required | Integer(1, 2,4,8,16,32,64) | Default value is 1, indicating continuous allocation |

The embodiments of the present invention provide a terminal, said terminal comprising: A receiving module, which is used to receive the repetition period information of the local cell transmitting the MBMS information, the identifiers of neighboring cells, and the repetition period information of said neighboring cells transmitting the MBMS information, before receiving the MBMS information; a determining module, which is used to determine the time periods for performing chip combining with the MBMS transmitted by the local cell, based on the receiving-module-received repetition period information of the local cell transmitting the MBMS information; a cell identifier obtaining module, which is used for obtaining the identifiers of neighboring cells that can run chip combining with the local-cell-transmitted MBMS information during the time periods determined by the determining module, based on the neighboring cell identifiers and the repetition period information of said neighboring cells transmitting the MBMS information, whereas said neighboring cell identifiers and said repetition period information are received by the receiving module; a chip combining module, which is used for: during the time periods determined by the determining module, performing chip combining between the MBMS information transmitted by the local cell and the MBMS information transmitted by the neighboring cells that correspond to the neighboring cell identifiers obtained by the cell identifier obtaining module.

After the terminal of the local cell received the resource scheduling information, i.e. the resource scheduling list, of the chip combining of an MBMS service, the terminal performs continuous or discontinuous chip combining on said MBMS service. The terminal receives the "MBMS Neighbouring Cell p-t-m rb Information" message on the MCCH channel; if the terminal is interested in an MBMS service, then during assigned time periods the terminal will perform chip combining with the S-CCPCHs that carry said MBMS service, according to the scheduling information of said S-CCPCHs configured in the local cell and multiple neighboring cells, thus implementing the chip combining of MBMS services during assigned time periods.

Figure 5:
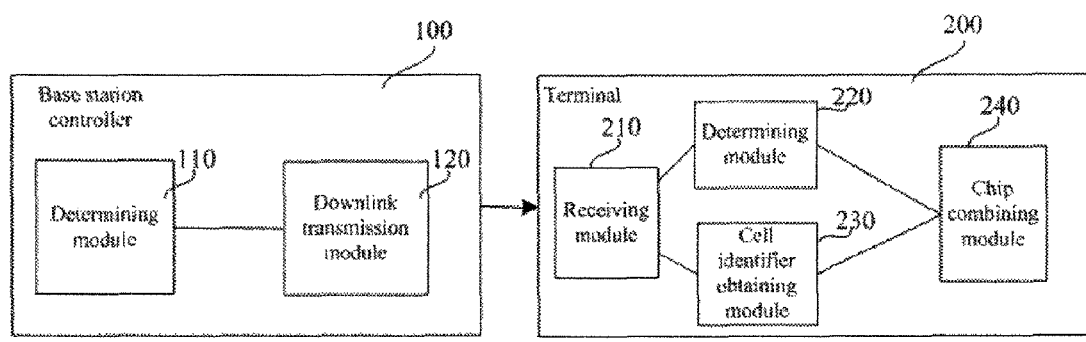
FIG. 5 is a schematic structure diagram of the MBMS service-based resource scheduling system according to the present invention.

The embodiment of the present invention also provides an MBMS service-based resource scheduling system, as shown in FIG. 5, comprising base station controller 100 and terminal 200, where the base station controller 100 comprising: a determining module 110, which is used, before transmitting the MBMS information, to determine the repetition period information of the local cell transmitting the MBMS information, and determine the repetition period information of the neighboring cells that carry the MBMS information transmitting said MBMS information; a downlink transmission module 120, which is connected to the determining module 110, and is used to transmit to a terminal of the local cell the identifiers of the local cell and neighboring cells, as well as the repetition period information of each cell transmitting the MBMS information, whereas said repetition period information is determined by the determining module 110.

The terminal 200 comprising: A receiving module 210, which is used to receive the repetition period information of the local cell transmitting the MBMS information, the identifiers of neighboring cells, and the repetition period information of said neighboring cells transmitting the MBMS information, before receiving the MBMS information; a determining module 220, which is used to determine the time periods for performing chip combining with the MBMS transmitted by the local cell, based on the repetition period information of the local cell transmitting the MBMS information, received by the receiving module 210; a cell identifier obtaining module 230, which is used for obtaining the identifiers of neighboring cells that can run chip combining with the local-cell-transmitted MBMS information during the time periods determined by the determining module 220, based on the neighboring cell identifiers and the repetition period information of said neighboring cells transmitting the MBMS information, whereas said neighboring cell identifiers and said repetition period information are received by the receiving module 210; a chip combining module 240, which is used for: during the time periods determined by the determining module 220, performing chip combining between the MBMS information transmitted by the local cell and the MBMS information transmitted by the neighboring cells that correspond to the neighboring cell identifiers obtained by the cell identifier obtaining module 230.

The embodiments of the present invention, implemented the resource scheduling of different cells during MBMS chip combining, where the chip combining technology requires the terminal to support the joint detection function. Currently the TD-SCDMA system supports the joint detection technology, the chip combining technology described in the embodiments of the present invention should not be limited to the TD-SCDMA system; the technical personnel in this area should understand that, when the WCDMA system subsequently introduces the joint detection technology, the chip combining technology described in the embodiments of the present invention is also applicable accordingly to the applications in corresponding scenarios of the WCDMA system.

It should be stated at the end that the above embodiments are only used to describe the technical schemes of the present invention, not to limit the present invention; despite the present invention having been elaborately described in reference to better embodiments, it should be understood by common technical personnel in this area that: it is still possible to modify, or replace part of the technical features with equivalent ones, on the technical scheme of the present invention, without detaching from the spit and scope of the technical schemes of the present invention.

What is claimed is:

1. A Multimedia Broadcast/Multicast Service (MBMS) service-based method for transmitting resource scheduling information, the method comprising the steps of:
   before transmitting MBMS information, determining information on a repetition period with which a local cell transmits the MBMS information;
   determining information on repetition periods with which respective neighboring cells carrying the MBMS information transmit the MBMS information; and
   transmitting an identifier of the local cell, identifiers of the neighboring cells, the information on the repetition period and the information on the repetition periods, to a terminal of the local cell,
   wherein the transmission of the identifier of the local cell and the identifiers of the neighboring cells, the information on the repetition period and the information on the repetition periods, to a terminal of the local cell comprises the steps of:
   adding the identifier of the local cell, the identifiers of the neighboring cells, the information on the repetition period and the information on the repetition period, into a resource scheduling list; and,
   transmitting the resource scheduling list to a terminal of the local cell.

2. The method of claim 1, wherein the information on the repetition period comprises a length of the repetition period; and the information on the repetition periods comprises lengths of the repetition periods.

3. The method of claim 2, wherein the information on the repetition period and the information on the repetition periods further comprise an individual cycle offset.

4. The method of claim 1, further comprising the steps of:
   analyzing, by the terminal, the resource scheduling list to obtain the information on the repetition period with which the local cell transmits the MBMS information, the information on the repetition periods with which the neighboring cells transmit the MBMS information, and the identifiers of the neighboring cells;
   determining time periods during which to perform chip combining with the MBMS information transmitted by the local cell, based on the information on the repetition period with which the local cell transmits the MBMS information;
   acquiring identifiers, of neighboring cells that participate in chip combining with the MBMS information transmitted by the local cell during determined time periods, from obtained identifiers of neighboring cells, based on obtained information on the repetition periods with which the neighboring cells transmit the MBMS information; and
   during the determined time periods, performing chip combining between the MBMS information transmitted by the local cell and the MBMS information transmitted by neighboring cells with acquired identifiers.

5. The method of claim 1, wherein the identifiers of the neighboring cells, and the information on the repetition periods with which the neighboring cells transmit the MBMS information are carried in an MBMS neighboring cell point-to-multipoint radio bearer message and transmitted to a terminal of the local cell.

6. A base station controller comprising:
   a determining module, wherein the determining module is used to determine information on a repetition period with which a local cell transmits MBMS information before the MBMS information is transmitted, and to determine information on repetition periods with which respective neighboring cells carrying the MBMS information transmit the MBMS information; and
   a downlink transmission module, wherein the downlink transmission module is connected to the determining module, and is used to transmit an identifier of the local cell, identifiers of the neighboring cells, and the information on the repetition period with which the local cell transmits the MBMS information and the information on the repetition periods with which the respective neighboring cells transmit the MBMS information determined by the determining module, to a terminal of the local cell, wherein the downlink transmission module comprises:
   an adding unit, used to add the identifier of the local cell and the identifiers of the neighboring cells, as well as the information on the repetition period with which the local cell transmits the MBMS information and the information on the repetition periods with which the respective neighboring cells transmit the MBMS information determined by the determining module, into a resource scheduling list; and
a downlink transmitting unit, used to transmit the resource scheduling list to a terminal of the local cell.

7. An MBMS service-based method for receiving resource scheduling information, the method comprising the steps of:
before receiving MBMS information, determining time periods during which to perform chip combining with the MBMS information transmitted by a local cell, based on received repetition period information of the local cell transmitting the MBMS information;
obtaining identifiers of the neighboring cells that perform chip combining with local-cell-transmitted MBMS information during the determined time periods, based on the received neighboring cell identifiers and the repetition period information of the neighboring cells transmitting the MBMS information; and
during the determined time periods, performing chip combining between the MBMS information transmitted by the local cell and the MBMS information transmitted by the neighboring cells that correspond to the obtained neighboring cell identifiers.

8. The method of claim 7, wherein the received repetition period information of the local cell transmitting the MBMS information, the neighboring cell identifiers, and the repetition period information of the neighboring cells transmitting the MBMS information are carried in a resource scheduling list.

9. The method of claim 7, wherein obtaining the neighboring cell identifiers and the repetition period information of the neighboring cells transmitting the MBMS information is obtained from a received MBMS neighboring cell point-to-multipoint radio bearer message.

10. A terminal comprising:
a receiving module, used for receiving repetition period information of a local cell transmitting MBMS information, one or more identifiers of neighboring cells, and repetition period information of neighboring cells transmitting the MBMS information, before receiving the MBMS information;
a determining module, used for determining time periods for performing chip combining with the MBMS transmitted by the local cell, based on a receiving-module-received repetition period information of the local cell transmitting the MBMS information;
a cell identifier obtaining module, used for obtaining identifiers of neighboring cells that run chip combining with local-cell-transmitted MBMS information during the time periods determined by the determining module, based on the neighboring cell identifiers and the repetition period information of the neighboring cells transmitting the MBMS information, whereas the neighboring cell identifiers and the repetition period information are received by the receiving module; and
a chip combining module, used for: during the time periods determined by the determining module, performing chip combining between the MBMS information transmitted by the local cell and the MBMS information transmitted by the neighboring cells that correspond to the neighboring cell identifiers obtained by the cell identifier obtaining module.

11. An MBMS service-based resource scheduling method, the method comprising the steps of:
before transmitting MBMS information, determining repetition period information of a local cell transmitting the MBMS information;
determining the repetition period information of neighboring cells that carry the MBMS information transmitting the MBMS information;
transmitting a local cell identifier and one or more neighboring cell identifiers, and the repetition period information of each cell transmitting the MBMS information, to a terminal of the local cell;
before receiving the MBMS information, the terminal determining time periods during which to perform chip combining with the MBMS information transmitted by the local cell, based on received repetition period information of the local cell transmitting the MBMS information;
obtaining the neighboring cell identifiers that perform chip combining with local-cell-transmitted MBMS information during the determined time periods, based on the received neighboring cell identifiers and the repetition period information of the neighboring cells transmitting the MBMS information; and
during the determined time periods, performing chip combining between the MBMS information transmitted by the local cell and the MBMS information transmitted by the neighboring cells that correspond to the obtained neighboring cell identifiers.

12. An MBMS service-based resource scheduling system, wherein the system comprises a base station controller and a terminal, the base station controller further comprising:
a determining module, for determining repetition period information of a local cell transmitting MBMS information, before transmitting the MBMS information; and determining repetition period information of neighboring cells that carry the MBMS information transmitting the MBMS information; and
a downlink transmission module, wherein the downlink transmission module is connected to the determining module, and is used to transmit one or more local cell identifiers, one or more neighboring cell identifiers, and determining-module-determined repetition period information of each cell transmitting the MBMS information, to a terminal of the local cell;
the terminal further comprising:
a receiving module, used for receiving repetition period information of a local cell transmitting MBMS information, one or more neighboring cell identifiers, and repetition period information of neighboring cells transmitting the MBMS information, before receiving the MBMS information;
a determining module, used for determining time periods for performing chip combining with the MBMS transmitted by the local cell, based on receiving-module-received repetition period information of the local cell transmitting the MBMS information;
a cell identifier obtaining module, which is used for obtaining the neighboring cell identifiers that run chip combining with local-cell-transmitted MBMS information during the time periods determined by the determining module, based on the neighboring cell identifiers and the repetition period information of the neighboring cells transmitting the MBMS information, wherein the neighboring cell identifiers and the repetition period information are received by a receiving module; and a chip combining module, wherein during the time periods determined by the determining module, the chip combining module conducts chip combining between the MBMS information transmitted by the local cell and the MBMS information transmitted by the neighboring cells that correspond to the neighboring cell identifiers obtained by the cell identifier obtaining module.

* * * * *